United States Patent
Liu et al.

(10) Patent No.: US 10,379,133 B2
(45) Date of Patent: Aug. 13, 2019

(54) SPEED ESTIMATION SYSTEMS

(71) Applicant: Simmonds Precision Products, Inc., Vergennes, VT (US)

(72) Inventors: Lei Liu, Shelburne, VT (US); Kyle M. Bruce, Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 450 days.

(21) Appl. No.: 15/002,364

(22) Filed: Jan. 20, 2016

(65) Prior Publication Data

US 2017/0205439 A1  Jul. 20, 2017

(51) Int. Cl.
| | |
|---|---|
| *G01P 3/44* | (2006.01) |
| *G01H 1/00* | (2006.01) |
| *G01P 3/48* | (2006.01) |
| *G01M 15/12* | (2006.01) |

(52) U.S. Cl.
CPC ............... *G01P 3/44* (2013.01); *G01H 1/003* (2013.01); *G01M 15/12* (2013.01); *G01P 3/48* (2013.01)

(58) Field of Classification Search
CPC ........................................................ G01P 3/44
See application file for complete search history.

(56) References Cited

U.S. PATENT DOCUMENTS

| | | | |
|---|---|---|---|
| 4,310,892 A | 1/1982 | Himmler | |
| 8,943,876 B2 | 2/2015 | Rowe et al. | |
| 8,985,068 B2 | 3/2015 | Nicgorski | |
| 2005/0209814 A1 | 9/2005 | Song | |
| 2014/0281779 A1 | 9/2014 | Wellman et al. | |
| 2016/0076931 A1* | 3/2016 | Bonnett | G01H 1/003 73/583 |

FOREIGN PATENT DOCUMENTS

KR    10-1372406 B1    3/2014

OTHER PUBLICATIONS

Extended European Search Report of the European Patent Office, dated May 23, 2017, in corresponding European Patent Application No. 17151942.4.
Yuanxi Yang and Tianhe Xu, "An Adaptive Kalman Filter Based on Sage Windowing Weights and Variance Components", The Journal of Navigation (2003), vol. 56, pp. 231-240.

* cited by examiner

*Primary Examiner* — Yu-Hsi D Sun
(74) *Attorney, Agent, or Firm* — Locke Lord LLP; Daniel J. Fiorello; Joshua L. Jones

(57) ABSTRACT

A method for estimating rotational speed of a system includes receiving vibrational data from a sensor, estimating a speed from the vibrational data to create estimated speed data, and filtering the estimated speed data through an adaptively weighted filter to minimize incorrect speed estimation.

5 Claims, 2 Drawing Sheets

SPEED ESTIMATION SYSTEMS

BACKGROUND

1. Field

The present disclosure relates to vibration signal processing systems and methods, more specifically to rotation speed and/or imbalance tracking for vibratory systems.

2. Description of Related Art

Estimating rotation speed through vibration is an important step in vibration based mechanical diagnostics and prognostics applications. Reliable speed estimation is rudimental to vibration data analysis and algorithmic processing since many failure signatures are highly correlated to the rotation speed, or the fundamental frequency. As the underlying physics of vibration analysis finds the periodic component existing in vibration associated with imbalanced rotation, correct speed estimations will also allow vibration due to imbalance be appropriately pinpointed, measured, and thus minimized with appropriate countermeasures without the need of a tachometer.

While many approaches for estimating fundamental frequency have been developed in various closely related fields, none have been able to give correct results once signal-to-noise ratio (SNR) drops to a certain degree. As implied by the ratio, a drop of SNR includes two potential factors: the increase of noises and the decrease of signals. Conventional or adaptive filters are often used to address the former when noises have known characteristics or are able to be referenced. However, non-stationary noises (e.g., those that emerge and fade out due to sudden changes in external environment) cannot be effectively attenuated. Worsened by the later factor, speed estimations can also become erroneous due to changes of operational conditions internally within systems (e.g., ramping up/down and loading shift). Spurious speed estimations that occur in these transient changes need to be identified and excluded before imbalance and conditions are algorithmically assessed.

Such conventional methods and systems have generally been considered satisfactory for their intended purpose. However, there is still a need in the art for improved speed estimation systems and methods. The present disclosure provides a solution for this need.

SUMMARY

A method for estimating rotational speed of a system includes receiving vibrational data from a sensor, estimating a speed from the vibrational data to create estimated speed data, and filtering the estimated speed data through an adaptively weighted filter to minimize incorrect speed estimation. In certain embodiments, the method can include determining (e.g., in real time) an operational condition (e.g., whether balanced or imbalanced) of the system using the filtered estimated speed.

Filtering the estimated speed data through the adaptively weighted filter can include filtering the estimated speed data through a Kalman filter having an adaptive weight. Filtering the estimated speed data through a Kalman filter having an adaptive weight can include filtering the estimated speed data through the Kalman filter which includes a Kalman gain $K_k$, wherein $$K_k = \frac{P_k^-}{P_k^- + wR},$$

wherein $P_k^-$ is an a priori prediction error covariance, R is a covariance matrix of measurement noises, and w is the adaptive weight.

Filtering the estimated speed data through a Kalman filter having an adaptive weight can include using a test statistic to measure the deviation of current estimation from previous estimations to enforce continuity in time domain. Using the test statistic can include determining errors between speed estimation and at least one of a speed prediction, a standard score, or a Mahalanobis distance to determine an estimation correctness and to modify the adaptive weight w if incorrect estimation is determined.

Modifying the adaptive weight w can include modifying the adaptive weight w in real time. Modifying the adaptive weight can include comparing a Mahalanobis distance D to a threshold T, and setting a value for the adaptive weight w such that, $$D = \sqrt{(v_k - \tilde{v}_{k-1})^T (P_k^-)^{-1} (v_k - \tilde{v}_{k-1})}$$

$$w = \begin{cases} 1 & D \leq T \\ D & D > T \end{cases}.$$

A speed estimation system for a rotational system can include one or several vibrational sensor(s) configured to output vibrational signals, a speed estimation module operatively connected to the vibrational sensor(s) to receive the vibrational signals and output estimated speed data based on the vibrational signals, and an adaptively weighted filter module configured to receive the estimated speed data and configured to output filtered estimated speed data.

The adaptively weighted filter module can include a Kalman filter having an adaptive weight. The Kalman filter can include a Kalman gain $K_k$, wherein $$K_k = \frac{P_k^-}{P_k^- + wR},$$

wherein $P_k^-$ is an a priori prediction error covariance, R is a covariance matrix of measurement noises, and w is the adaptive weight.

In certain embodiments, the system can form part of or can be operatively connected to a controller which controls one or more inputs to the rotational system to provide feedback to the controller.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
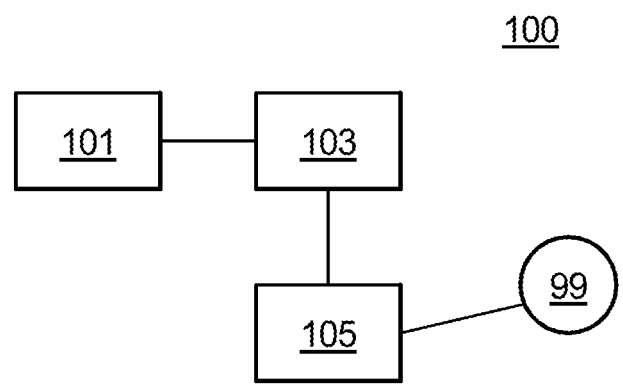
FIG. 1 is a schematic diagram of an embodiment of a system in accordance with this disclosure.
Figure 2:
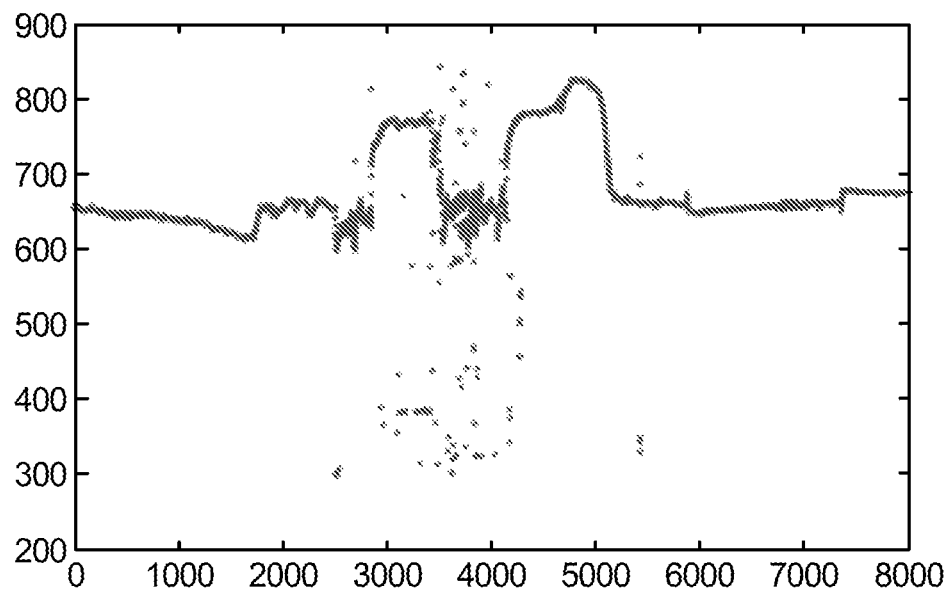
FIG. 2A is a chart showing speed estimated from a vibration (e.g., a single channel) when a rotational system under observation is in volatile operation.
FIG. 2B is a chart showing a Kalman filter applied to the estimated speeds of FIG. 2A to smooth results.
FIG. 2C is a chart showing speed estimation with rejection after applying an adaptively weighted Kalman filter to the estimated speed in FIG. 2A in accordance with this disclosure.
Figure 2B:
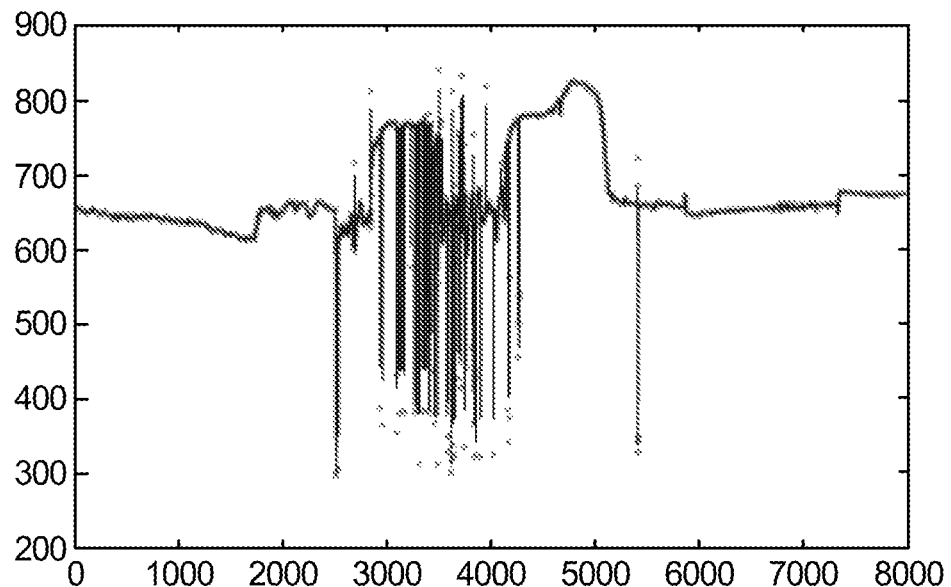
Figure 2C:
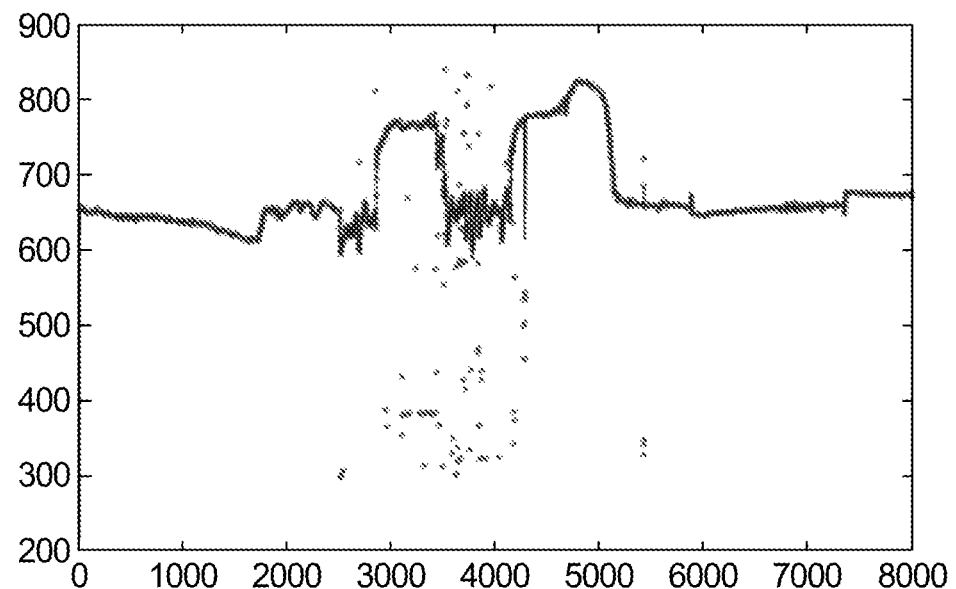

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-2C. The systems and methods described herein can be used to more accurately estimate speed and/or any other suitable use.

Referring to FIG. 1, a speed estimation system 100 for a rotational system (not shown) can include at least one vibrational sensor 101 configured to output vibrational signals. The vibrational sensor 101 can include any suitable sensor (e.g., an accelerometer). The at least one sensor 101 can be mounted in any suitable location (e.g., externally mounted to a vibrational system such as a housing of a compressor).

The system 100 can include a speed estimation module 103 operatively connected to the vibrational sensor 101 to receive the vibrational signals and output estimated speed data based on the vibrational signals. The speed estimation 103 can estimate speed based on the vibrations of the rotational system via any suitable speed estimation methods/models (e.g., as described herein below).

The system 100 also includes an adaptively weighted filter module 105 configured to receive the estimated speed data and configured to output filtered estimated speed data. The adaptively weighted filter module 105 can filter the estimated speed date using any suitable methods/models (e.g., a weighted Kalman filter as described hereinbelow). In certain embodiments, the system 100 can form part of or can be operatively connected to a controller 99 which controls one or more inputs to the rotational system to provide feedback to the controller 99.

Using the fact that rotation speed can only change continually in a mechanical system, spurious speed estimations can be rejected by constantly tracking the estimations and using speed continuity as a criteria to determine the validity of individual estimation. This imposes a layer of continuity enforcement in time domain on top of estimation results, and it can be viewed as a low pass filtering gate with cut-off frequency being able to be adapted to the physics of systems of interests. To this end, a Kalman filter can be routinely used to provide predictions to be compared with estimations to obtain reliable results.

Unfortunately, predictions from a traditional Kalman filter are subject to heavy influences from outliers, namely those previously incorrect speed estimations. This is because the Kalman filter is linear and built upon normality assumption, therefore a single outlier will spoil many of the subsequent predictions. A direct consequence in speed estimation is that many correct estimation results following an incorrect estimation can be falsely identified as incorrect. This is worsened when transient noises/changes are highly frequent, and may render no output from the filter at all.

A discrete time model for tracking changes of speed estimation can be written as, $$v_k = v_{k-1} + u + w \quad (1)$$

where $v_k$ is a vector of estimated speeds at time instant k, $v_{k-1}$ is a vector of speeds at time instant k−1, u is the speed changes between the time instants, and w is the inaccuracies or noises due to the estimation of speeds from vibrations. For a single vibration channel, the model simply reduces to a univariate system.

The model can be easily rearranged into the standard Kalman filter model by setting both the state transition matrix and the observation matrix to be identity matrices and further treating the speed change u as a process noise. It is apparent that the two noise terms are independent of each other, thereafter they are assumed to be normally distributed as p(u)~N(0, Q) and p(w)~N(0,R), respectively.

The model has a strong physical basis. On one hand, the variance of the process noise, Q, is directly related to the specification of underlying mechanical systems and can be easily quantified. That is, under normal operation conditions, the maximum allowable change of speed is usually bounded by specification and therefore can be confidently used for Q. On the other hand, the covariance matrix R of the measurement noises is reduced to a diagonal matrix following the assumption on inter-channel independence. The variance of each vibration channel, or the diagonal element of R, may be further quantified by the resolution of the speed estimation algorithm, which is often theoretically attainable. In a typical application that all vibration channels use the same algorithm, R may have identical diagonal elements.

Using a Kalman filter, a prediction of speed can be obtained by the current speed estimation and the prediction from the previous step. The recursive step can be expressed as, $$\tilde{v}_k = \tilde{v}_{k-1} + K_k(v_k - \tilde{v}_{k-1}) \quad (2)$$

where $\tilde{v}_k$ is the current predicted speed value, $\tilde{v}_{k-1}$ is the preceding predicted speed value, $v_k$ is the estimated speed value, and $K_k$ is the Kalman gain. Measuring the distance between the prediction and the estimation provides a way to reject spurious estimations. However, as previously stated, a single outlier in estimation will affect several future predictions. This can be justified by examining the Kalman gain simplified for model (1) and written in a set of recursive equations as, $$K_k = \frac{P_k^-}{P_k^- + R} \quad (3)$$
$$P_k^- = P_{k-1} + Q = (I - K_{k-1})P_{k-1}^- + Q$$

where $P_k^-$ is the current a priori prediction error covariance, $P_{k-1}^-$ is the preceding a priori prediction error covariance, $P_{k-1}$ is the preceding a posteriori prediction error covariance, $K_{k-1}$ is the preceding Kalman gain, R is the covariance matrix of the measurement noises, and I is the identity matrix. It can be seen from these equations that, if Q and R remain constant per the model, both Kalman gain K and prediction error covariance P stabilize over time and converge to constants as well. An outlier in estimation will invalidate the implication of Q in the model such that its residual effect only slowly disappears in proceeding predictions.

To improve robustness and accuracy, the Kalman gain is modified by introducing an adaptive weight, w, into Eq. (3) as, $$K_k = \frac{P_k^-}{P_k^- + wR} \quad (4)$$

This can be understood by noticing that the noise covariance is equivalently increased in response to an outlier. Consequently, K and P will not converge to constants anymore but be adaptive. It would be expected that a suitable adaptive weight would make the Kalman gain less sensitive to a predefined noise covariance R when an outlier is detected, meanwhile this can allow the Kalman gain to restore to its optimum value quickly if the outliers are no longer present.

To detect outliers and to define an adaptive weight, certain test statistics can be utilized. For example the Mahalanobis distance for multiple vibration channels can be utilized. The test statistic quantifies the errors between speed estimation and prediction, and therefore can be compared to a threshold T such that, $$D = \sqrt{(v_k - \tilde{v}_{k-1})^T (P_k^-)^{-1} (v_k - \tilde{v}_{k-1})} \quad (5)$$
$$w = \begin{cases} 1 & D \leq T \\ D & D > T \end{cases}$$

In the case of a single vibration channel, the Mahalanobis distance D reduces to a standard score noticing that $P_k^-$ is in fact the prediction error variance. The selection of the threshold T becomes trivial in this case as 3 is a natural choice.

Referring to FIGS. 2A, 2B, and 2C, an embodiment of speed estimation data is shown without filtering (in FIG. 2A), with a traditional Kalman filter (in FIG. 2B), and with an embodiment of a adaptively weighted Kalman filter as described above (in FIG. 2C). As can be seen, the results of the adaptively weighted Kalman filter track a much more accurate and realistic speed estimation.

Any suitable portion or the entirety of the above described methods and systems can be implemented via any suitable computer hardware (e.g., a microprocessor, a memory) or software (of any suitable language). In certain embodiments, any suitable portion or the entirety of the above described methods and systems can form a part of or be operative with a controller connected to the vibratory system (e.g., a compressor), such that the controller can control one or more inputs (e.g., speed) to the vibratory system.

As described above, a speed estimating system having a robust adaptively weighted filter (e.g., the above described weighted Kalman filter) can be designed to minimize the adverse consequence from incorrect speed estimations. A test statistic of errors between speed estimation and prediction, standard score or Mahalanobis distance, can be used to decide the estimation correctness and further to modify the filter (e.g., Kalman filter gain) if incorrect estimation is determined. The test statistic can measure the deviation of current estimation from previous noisy estimations, therefore providing a way to enforce continuity in time domain. In the meantime, the modified gain makes predictions less sensitive to preceding incorrect estimations. The accurate speed estimation results can then be used for determining if there is imbalanced vibration and other condition indicators in real time (e.g., for a compressor, fan, or any other suitable device)

Restated, rotation speeds can be continuously tracked in real time, and spurious speed estimations can be rejected in an early stage so as to not contaminate speed measurements and associated operational conditions, e.g. imbalanced vibration. Embodiments can reduce artifacts/noises in failure signatures that are closely related to those measurements when a speedometer or tachometer is not available.

The methods and systems of the present disclosure, as described above and shown in the drawings, provide for speed estimation systems with superior properties including improved speed estimation. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for estimating rotational speed of a system, comprising:
    receiving vibrational data from a sensor;
    estimating a speed from the vibrational data to create estimated speed data; and
    filtering the estimated speed data through an adaptively weighted filter to minimize incorrect speed estimation, wherein filtering the estimated speed data through the adaptively weighted filter includes filtering the estimated speed data through a Kalman filter having an adaptive weight,
    wherein filtering the estimated speed data through the Kalman filter having an adaptive weight includes:
    filtering the estimated speed data through the Kalman filter which includes a Kalman gain $K_k$, wherein $$K_k = \frac{P_k^-}{P_k^- + wR},$$

wherein $P^-$ is an a priori prediction error covariance, R is a covariance matrix of measurement noises, and w is the adaptive weight; and
    using a test statistic to measure the deviation of current estimation from previous estimations to enforce continuity in time domain, wherein using the test statistic includes determining errors between speed estimation and at least one of a speed prediction, a standard score, or a Mahalanobis distance to determine an estimation correctness and to modify the adaptive weight w if incorrect estimation is determined.

2. The method of claim 1, wherein modifying the adaptive weight w includes modifying the adaptive weight w in real time.

3. The method of claim 1, wherein modifying the adaptive weight includes a comparing a Mahalanobis distance D to a threshold T, and setting a value for the adaptive weight w such that, $$D = \sqrt{(v_k - \tilde{v}_{k-1})^T (P_k^-)^{-1} (v_k - \tilde{v}_{k-1})}$$
$$w = \begin{cases} 1 & D \leq T \\ D & D > T \end{cases}.$$

4. A speed estimation system for a rotational system, comprising:

a vibrational sensor configured to output vibrational signals;

a speed estimation module operatively connected to the vibrational sensor to receive the vibrational signals and output estimated speed data based on the vibrational signals; and adaptively weighted filter module configured to receive the estimated speed data and configured to output filtered estimated speed data, wherein the adaptively weighted filter module includes a Kalman filter having an adaptive weight, wherein the Kalman filter includes a Kalman gain $K_k$, wherein $$K_k = \frac{P_k^-}{P_k^- + wR},$$

wherein $P^-$ is an a priori prediction error covariance, R is a covariance matrix of measurement noises, and w is the adaptive weight, wherein the adaptively weighted filter module is configured to use a test statistic to measure the deviation of current estimation from previous estimations to enforce continuity in time domain such that the adaptively weighted filter module is configured to determine errors between speed estimation and at least one of a speed prediction, a standard score, or a Mahalanobis distance to determine an estimation correctness and to modify the adaptive weight w if incorrect estimation is determined.

5. The system of claim 4, wherein the system forms part of or is operatively connected to a controller which controls one or more inputs to the rotational system to provide feedback to the controller.

* * * * *